United States Patent

Stubblefield

[11] 3,712,382
[45] Jan. 23, 1973

[54] HORSE OR THE LIKE SHOE DEVICE
[76] Inventor: Maurice Stubblefield, Clancy, Mont. 59634
[22] Filed: March 18, 1971
[21] Appl. No.: 125,598

[52] U.S. Cl. ................................. 168/22, 168/19
[51] Int. Cl. .................................................. A01l 3/04
[58] Field of Search .................. 168/3, 10, 18, 19, 22

[56]              References Cited
             UNITED STATES PATENTS

| 1,429,583 | 9/1922  | Gillies    | 168/22 |
| 3,163,230 | 12/1964 | Christensen| 168/22 |
| 584,701   | 6/1897  | Pflueger   | 168/4  |
| 817,625   | 4/1906  | Crannell   | 168/22 |
| 1,206,640 | 11/1916 | Zipay      | 168/19 |

FOREIGN PATENTS OR APPLICATIONS

| 3,139 | 0/1876 | Great Britain | 168/19 |

Primary Examiner—Louis G. Mancene
Assistant Examiner—James H. Czerwonky
Attorney—Baldwin, Wight & Brown

[57]             ABSTRACT

A horse or the like shoe device, readily attachable to and removable from a hoof, comprises a first hook formed with an upwardly convex flange on a shoe part toe portion closed at its top and curled rearwardly, downwardly and forwardly in the toe portion and opening toward the bottom of the shoe part, and a toe piece provided with a second hook having an upwardly convex flange and being curled correspondingly to the curl of the first hook flange and interengageable with the first hook for removably connecting the toe piece to the shoe part. Means such as a bail engages the toe piece and is connected to the rear of the shoe part for maintaining the toe piece in contact with the hoof front and for retaining the hooks interengaged with one another, thereby retaining the shoe part attached to the hoof. Guide means are provided to facilitate interengagement of the two flange portions.

8 Claims, 7 Drawing Figures

PATENTED JAN 23 1973 3,712,382
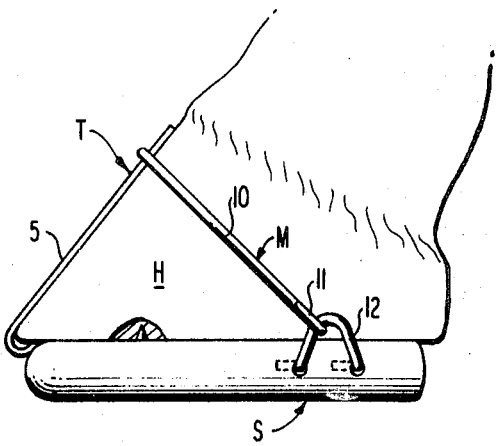
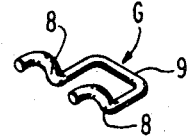
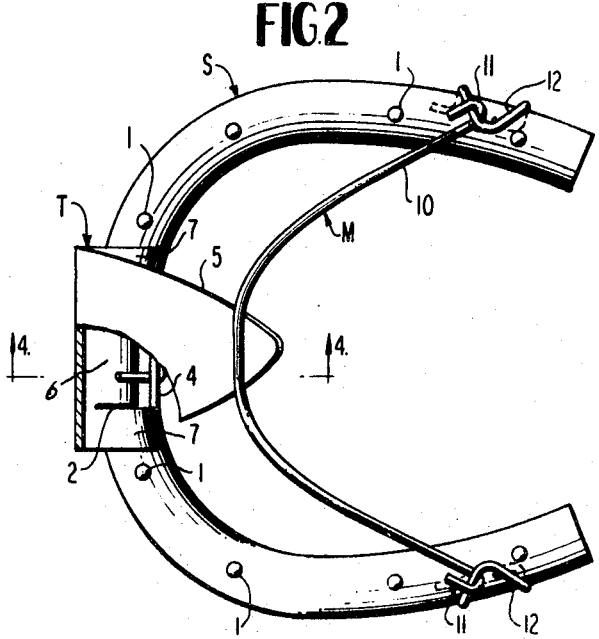
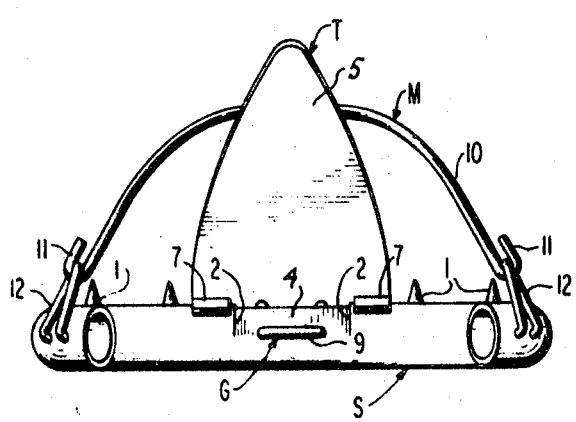
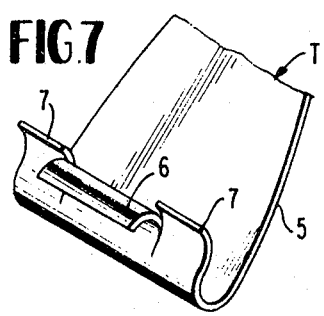
INVENTOR
MAURICE STUBBLEFIELD
BY Baldwin Wight & Brown
ATTORNEYS

HORSE OR THE LIKE SHOE DEVICE

This invention relates to improvements in or relating to horse or the like (animal) shoe devices, and more particularly to such devices as may readily be applied to and removed from an animal hoof without the requirement for special tools or the services of a professional or skilled farrier.

It is known that horses, either work or saddle, frequently require shoeing more promptly than would be possible if the owner would have to take the animal to a farrier, or await response to a call for the farrier to come to the owner's place. For dealing with such circumstances, there have been a number of prior art proposals to provide an animal shoe which may serve at least temporarily and which may readily be applied and removed by anyone having a fair working knowledge of handling horses. The present invention relates to this general class of readily appliable and removable animal shoe devices.

An object of the invention is to provide an improved shoe device of the general character stated above which is of simple and inexpensive construction, and which may readily be applied to and removed from a hoof without the necessary exercising of a farrier's skill.

Another object of the invention is to provide such a device which is characterized by a simple and effective arrangement of hooks for attaching a toe piece to a shoe proper part.

Other objects of the invention will become apparent from a reading of the following more detailed description of a representative construction embodying the invention, the appended claims, and the accompanying drawings, in which:

FIG. 1 is a side elevational view of a device embodying the invention attached to an animal hoof;

FIG. 2 is a top plan view of the device shown in FIG. 1 with the hoof omitted and a toe piece included in the device being partly broken away more clearly to show the connection of the toe piece to a shoe part;

FIG. 3 is a rear elevational view of the device with the parts in the positions they occupy when the device is attached to a hoof, but with the hoof itself omitted.

FIG. 4 is a fragmentary section on the line 4—4 of FIG. 2, showing the parts in the same relative positions as in FIGS. 1-3;

FIG. 5 is a fragmentary sectional view, also on the line 4—4 of FIG. 2, but showing a toe piece in an intermediate position as when being connected to the shoe part;

FIG. 6 is a perspective view of a guide member; and

FIG. 7 is a fragmentary perspective view of the toe piece.

Considered in its general nature, the representative embodiment of the device shown in the drawings comprises a shoe part generally designated S, a toe piece T hooked at its lower end to the front of the shoe part S, and means M engaging the toe piece T above the hooking of the toe piece T to the shoe part S and being connected to the rear of the shoe part S so as to maintain the toe piece T in contact with the front of the animal hoof H, thereby retaining the toe piece T and shoe part S in hooking engagement so as to maintain the device firmly attached to the hoof H.

The shoe part S, as viewed in plan, is of the more or less conventional horseshoe configuration, i.e. being of modified U-shape. In the form shown, the shoe part S is of tubular cross section although the shoe part may be of other cross sections such as at least solid in part. The top of the shoe part S is provided with a number of pointed projections or spurs 1 adapted to be extended into the hoof H.

Considering the construction of the shoe part S more specifically, it is hollow at its front, as shown being tubular. The toe portion at the front of the tubular shoe part S is slitted at two spaced locations 2, 2 to provide a front hook 3 formed of a flange and a rear ear 4. The hook 3 extends rearwardly and then downwardly. In forming the hook 3, the material between the slits 2, 2 is curled rearwardly and downwardly and terminates with its lower free edge spaced above the bottom of the hollow front part of the shoe part S, thus leaving a gap between the hook 3 free edge and the bottom of the shoe part toe portion. The hook 3 is closed at its top and opens downwardly toward the bottom of the shoe part S.

The toe piece T includes a flat blade 5 formed at its lower end with a second hook 6 formed of a flange which is curved correspondingly to the curvature of the first hook 3. The second hook 6 is also formed with two curved steadying parts 7, 7 disposed on opposite sides of the second hook 6, the purpose of the parts 7, 7 being explained hereinafter.

In order to affix the device to a hoof H, the shoe part S is first placed under the hoof H and tapped upwardly so as to project the spurs 1 into the hoof. The toe piece T is then positioned in front of the shoe part S and the hook 6 at the bottom of the toe piece is inserted over the top of the first hook as shown in FIG. 5. In order to facilitate insertion of the hook 6 over the hook 3, a U-shaped guide G having legs 8, 8 and a connecting part 9 is mounted on the ear 4. The guide legs 8, 8 extend loosely through openings in the ear 4 and toward the front of the shoe part S, the legs 8, 8 being offset upwardly as shown in FIGS. 4 and 5 to overlie the hook 3. The guide G, being loosely mounted on the ear 4, can rock vertically just enough to facilitate insertion of the toe piece ear 6 between the forward ends of the guide legs 8, 8 and the top of the hook 3 without binding, nevertheless assisting in guiding the hook 6 during its insertion over the hook 3. After the hook 6 has been inserted between the guide legs 8, 8 and the hook 3 as shown in FIG. 5, the toe piece T is swung clockwise as viewed in the drawings to the position shown in FIG. 4 so that the hooks 3 and 6 will be interengaged on mating curved surfaces of substantial area of contact to maintain the toe piece T against detachment from the shoe part S as long as the toe piece remains in the angular position with respect to the shoe part S shown in FIG. 4.

The means generally designated M holds the toe piece T in its FIG. 4 position in contact with the hoof front to retain the entire device attached to the hoof. In the form shown, the means M comprises a wire or the like bail 10 having hooked ends 11, 11 engaged with loops 12, 12 anchored to the sides of the shoe part S. In securing the means M, one hook end 11 of the bail 10 may readily be hooked to a companion loop 12 and the other hooked end 11 straightened out and passed through the other loop 12, after which the last mentioned hooked end 11 may be bent back to its hooking position.

When the toe piece T is held against the front of the hoof H and the hooks 3 and 6 are thus held in operative interengagement, the steadying parts 7, 7 engage the top of the shoe part S as shown in FIGS. 2 and 4 so as to prevent tipping of the toe piece T laterally about the interengaged hooks 3 and 6.

It is apparent that in order to remove the device from the animal's hoof, it is necessary only to straighten one hook end of the bail 10 and detach it from its associated loop 12, remove the bail, and rock the toe piece counterclockwise from the position shown in FIG. 4 to permit the hook 6 to be disengaged from the hook 3.

The construction shown embodies the invention in a preferred form, but the disclosure is intended to be illustrative rather than definitive of the invention.

I claim:

1. A horse or the like shoe device readily attachable to and removable from a hoof, comprising a shoe part with a toe portion at its front, said toe portion having a first hook comprising a flange formed with an upwardly convex top portion and being curled rearwardly and downwardly and forwardly in said toe portion and opening toward the bottom of said shoe part; a toe piece formed with a second hook comprising a flange having an upwardly convex top portion and being curled correspondingly to the curling of said first hook and interengaging with said first hook on mating curved surfaces of substantial area of contact a portion of said second hook flange extending under and in contact with the forwardly curled part of said first hook flange for removably connecting said toe piece to said shoe part; and means engaging said toe piece above said hooks and being connected to said shoe part at the rear of said shoe part toe portion for maintaining said toe piece in contact with the hoof front and for retaining said hooks interengaged with one another and thereby retaining said device attached to the hoof.

2. A horse or the like shoe device according to claim 1 in which said toe piece is provided on opposite sides of said second hook part with steadying parts engageable with the top of said shoe part when said hook parts are interengaged, thereby to hold said toe piece against lateral tipping about the interengaged hooks.

3. A horse or the like shoe device according to claim 1 in which said shoe part toe portion is hollow, and is slitted at two spaced locations, the material between the slits being curled rearwardly and downwardly to form said first hook flange, the downturned end of said first hook terminating in spaced relation to the bottom of said hollow toe portion to receive said second hook.

4. A horse or the like shoe device according to claim 3, in which said first hook extends rearwardly from the shoe part toe portion and then downwardly, leaving a gap between the free edge of said first hook and the front of the shoe part toe portion.

5. A horse or the like shoe device according to claim 3 in which said shoe part toe portion is provided with an ear to the rear of and spaced from said first hook, said device further including a guide member extending forwardly from said ear and overlying said first hook in spaced relation thereto.

6. A horse or the like shoe device according to claim 5 in which said guide member is generally U-shaped and comprises spaced legs and a connecting part, said legs extending forwardly through said ear and overlying said first hook and being spaced vertically thereabove, said second hook being extended between said guide legs and said first hook, said guide legs facilitating the placement of said second hook in engagement with said first hook.

7. A horse or the like shoe device according to claim 6 in which said guide legs extend loosely through respective openings in said ear, whereby said guide member can rock vertically to enable insertion of said second hook between said guide legs and said first hook.

8. A horse or the like shoe device according to claim 6 in which the guide leg portions extending in front of said ear are offset upwardly from the leg portions extending rearwardly through said ear.

* * * * *